United States Patent
Maresko

(10) Patent No.: US 6,971,724 B1
(45) Date of Patent: Dec. 6, 2005

(54) METHOD AND APPARATUS FOR SIMULATING A FAILED HEAVY VEHICLE AIR BRAKE SYSTEM

(75) Inventor: William A. Maresko, Mattawan, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/963,485

(22) Filed: Oct. 12, 2004

(51) Int. Cl.[7] .................................................. B60T 7/20
(52) U.S. Cl. .......................... 303/123; 73/129; 73/39; 303/20
(58) Field of Search ................................ 303/3, 15, 20, 303/122.04, 123, 44; 73/121, 39, 128, 129

(56) References Cited

U.S. PATENT DOCUMENTS

| | | | |
|---|---|---|---|
| 4,050,298 A | 9/1977 | Hope et al. | |
| 5,668,314 A | 9/1997 | Jones | |
| 6,530,261 B1 * | 3/2003 | Foster | 73/129 |
| 6,609,768 B1 * | 8/2003 | Frank | 303/20 |
| 6,719,376 B1 * | 4/2004 | Klein et al. | 303/3 |
| 6,817,234 B1 * | 11/2004 | Maresko | 73/121 |

* cited by examiner

*Primary Examiner*—Melanie Torres
(74) *Attorney, Agent, or Firm*—Marshall & Melhorn LLC.

(57) ABSTRACT

A method and apparatus for simulating a failure in a heavy vehicle air brake system where a failure initiation switch is connected to a failed system selector switch and both switches are connected to a first valve associated with a primary braking system and a second valve associated with a secondary braking system of a vehicle. The failure initiation switch and the failed system selector switch are used to selectively interrupt a braking signal to either said primary braking system or said secondary braking system.

20 Claims, 3 Drawing Sheets

METHOD AND APPARATUS FOR SIMULATING A FAILED HEAVY VEHICLE AIR BRAKE SYSTEM

FIELD OF THE INVENTION

The present invention relates to a method and apparatus for testing vehicle braking systems and more particularly to simulating a failed vehicle air brake system, such as on heavy vehicles.

BACKGROUND OF THE INVENTION

Those skilled in the art are familiar with various federal motor vehicle braking safety standards that require stopping distances to be measured for a vehicle with the primary and the secondary brake systems individually simulated in the failed condition. Currently, hand operated valves located in the engine compartment of the vehicle are used to interrupt the control signal to both brake systems.

The hand operated valve method is disadvantageous since it becomes impossible in an emergency for the vehicle operator to quickly override the test system and engage full braking while the vehicle is moving. Additionally, the hand operated valve method is inefficient since an operator must stop the vehicle, open the engine compartment and manually open and close the valves to switch between testing the primary system and the secondary system. The hand operated valve method is also disadvantageous since both valves can be accidentally set to the failed position, thus providing the vehicle operator with no brakes.

In light of the disadvantages of the known testing systems, it would be advantageous to have a method and apparatus for testing the braking systems of a vehicle that allows the operator to abort a test and quickly engage both braking systems. It would also be advantageous to have a method and apparatus for testing vehicle braking systems that allows the operator to control the braking systems from the operator's compartment of the vehicle. Additionally, it would be advantageous for a method and apparatus for testing vehicle braking systems to reduce, or prevent, the possibility that both brake systems could be inadvertently set to fail at the same time.

SUMMARY OF THE INVENTION

The present invention is directed toward an air brake testing system comprising a failure initiation switch connected to a failed system selector switch. A first valve and a second valve are selectively connected to the failure initiation switch through the failed system selector switch. The first valve is in communication with a primary braking system and the second valve is in communication with a secondary braking system.

The present invention is also directed toward a method of using the air brake testing system comprising positioning the failed system selector switch at a first brake system setting, or a second brake system setting, and selectively activating the failure initiation switch to cause to fail one of the braking systems and engage the other braking system while the vehicle is moving.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
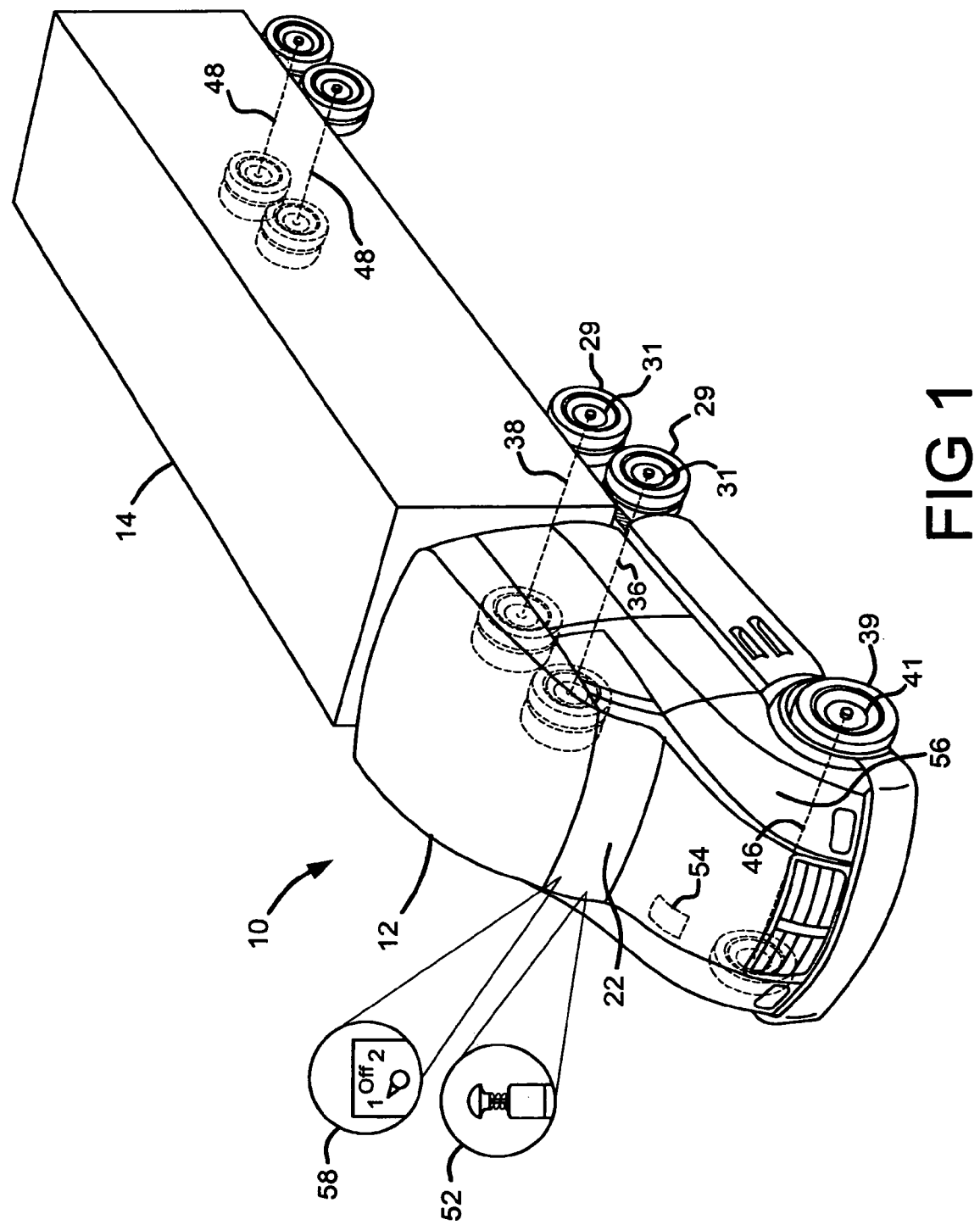
FIG. 1 is a schematic view of a vehicle with which the present invention may be used.
Figure 2:
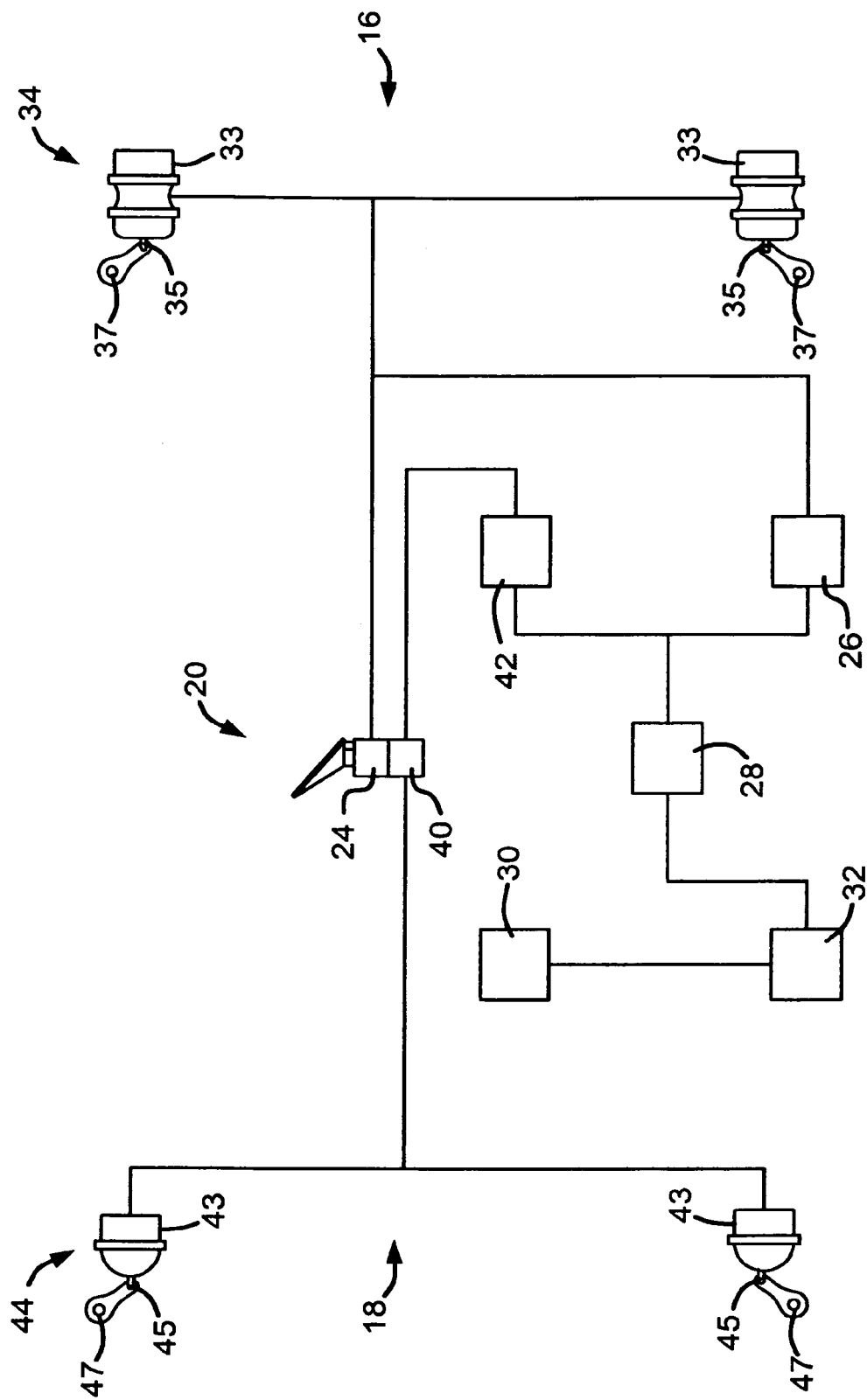
FIG. 2 is a schematic layout of a primary brake system and secondary brake system.

FIG. 1 depicts one embodiment of a vehicle 10 with which the present invention may be used. The vehicle depicted is a tractor 12 and an associated trailer 14, as known to those skilled in the art. Preferably, at least the tractor 12 has a primary brake system 16 and a secondary brake system 18, which are schematically depicted in FIG. 2. The primary brake system 16 and the secondary brake system 18 may also be connected to a trailer braking system (not shown), however, the present invention is directed to the brake systems 16, 18 of the tractor 12. The primary brake system 16 is independent of the secondary brake system 18 and either system 16, 18 is capable of slowing and stopping the vehicle 10 upon the failure, or malfunction, of the other.

Those skilled in the art will appreciate that the primary brake system 16 and the secondary brake system 18 are air brake systems. The primary brake system 16 is comprised of a brake pedal 20 in an operator's compartment 22 of the tractor 12, where the brake pedal 20 is connected to a primary treadle valve 24, as shown in FIGS. 1 and 2. Looking now at just FIG. 2, the primary treadle valve 24 is connected a primary air reservoir 26. The primary air reservoir 26 is connected to a supply tank 28 that is supplied with air by an engine driven compressor 30. Preferably, the air from the compressor 30 is diverted to an air dryer 32 before it enters the supply tank 28.

The primary air reservoir 26 is connected to a brake set on the rear axle of the tractor 12, known as the secondary brake set 34. Those skilled in the art will appreciate that the secondary brake set 34 comprises at least one wheel, a friction device (not shown) for slowing the wheel 31, a tire 29 mounted on each wheel 31, a brake actuating chamber 33, and a slack adjuster 37, as shown in FIGS. 1 and 2. The brake actuating chamber 33, depicted in FIG. 2, comprises a diaphragm (not shown) and a push rod 35. The push rod 35 is connected to the slack adjuster 37. The slack adjuster 37 is connected to a rotating cam (not shown) that forces the friction device (not shown) into the wheel 31.

The rear axle may be comprised of a single axle, or it may be a forward rear axle 36 and a rear rear axle 38, as depicted in FIG. 1. If the rear axle is comprised of a forward rear axle 36 and a rear rear axle 38, one or both of the axles 36, 38 may be driven.

The secondary brake system 18 comprises a secondary treadle valve 40, also connected to the brake pedal 20, best seen in FIG. 2. The secondary treadle valve 40 is connected to a secondary air reservoir 42. The secondary air reservoir 42 is connected to the supply tank 28. The secondary brake system 18 is connected to a brake set on a front steer axle 46 (see FIG. 1) of the tractor 12 called the primary brake set 44.

The primary brake set 44 also comprises at least one wheel 41, a friction device (not shown) for slowing the wheel 41, a tire 39 mounted on each wheel 41, a brake actuating chamber 43, and a slack adjuster 47, as shown in FIGS. 1 and 2. The brake actuating chamber 43, depicted in FIG. 2, comprises a diaphragm (not shown) and a push rod 45. The push rod 45 is connected to the slack adjuster 47. The slack adjuster 47 is connected to a rotating cam (not shown) that forces the friction device (not shown) into the wheel 41.

Under normal operating and driving conditions, when the brake pedal 20 is depressed, compressed air is provided from both the primary air reservoir 26 and the secondary air reservoir 42 to the rear axle, or axles 36, 38, and the front steer axle 46, respectively, to brake the vehicle 10. Typically, both the primary air reservoir 26 and the secondary air reservoir 42 are also connected to a trailer braking system associated with one or more axles 48 on the trailer 14.

Figure 3:
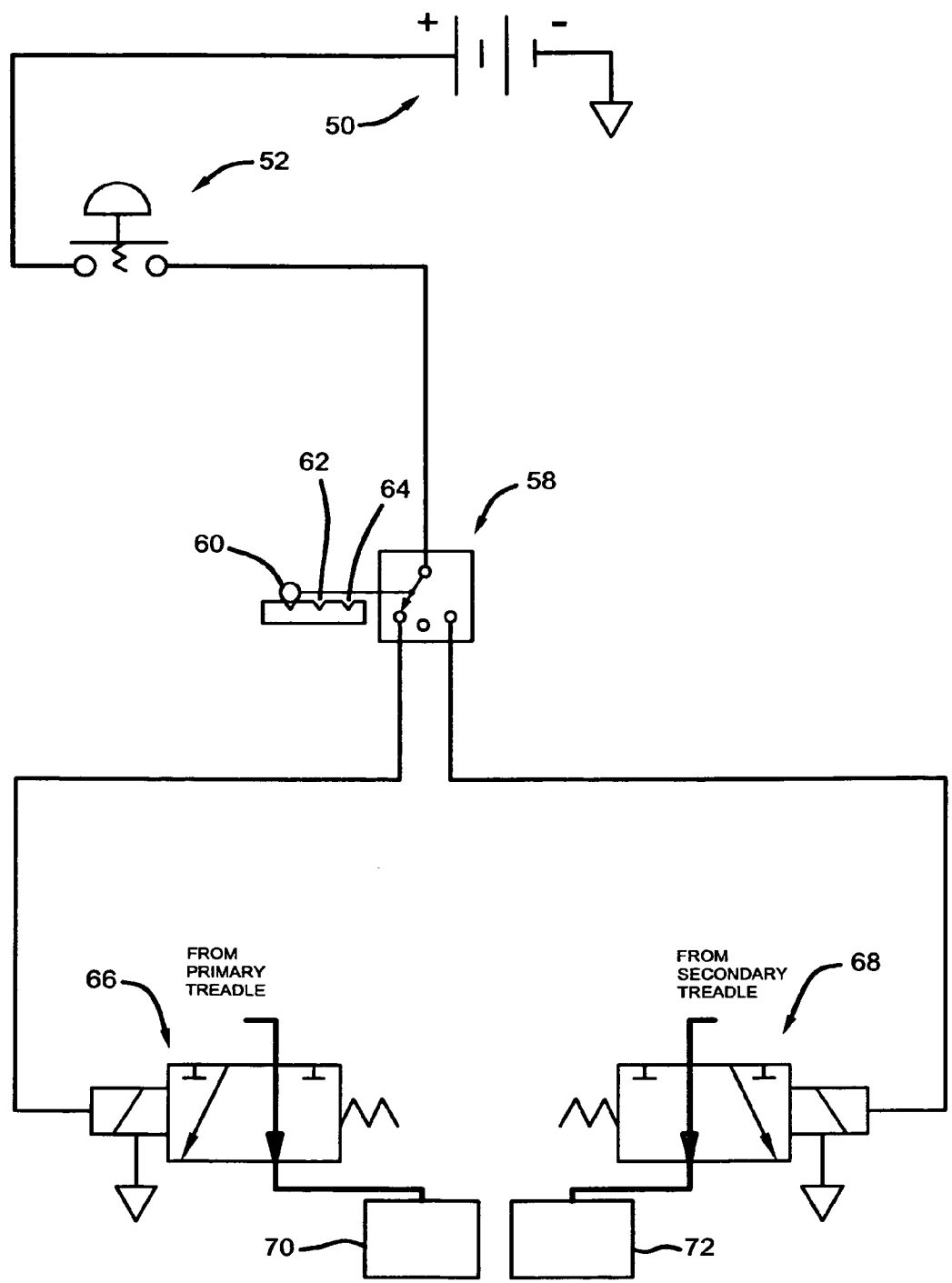
FIG. 3 is a schematic view of the apparatus of the present invention.

Referring now to FIG. 3, various components of the apparatus of the present invention are schematically depicted. A power source 50 is depicted connected to a failure initiation switch 52. The power source 50 is preferably one or more batteries located in an engine compartment 56, or adjacent the engine compartment 56, of the vehicle 10, shown in FIG. 1. Those skilled in the art know that at least one 12-volt battery 54 is standard in most tractor trailer vehicles 10 and a power source 50 of such voltage is well suited for the present invention.

Alternatively, a separate power source may be used that is independent from the vehicle battery without departing from the scope of the present invention. The separate power source, such as a 12-volt battery, may be located in the engine compartment 56, or anywhere else on the vehicle 10, where it can be connected to the failure initiation switch 52.

The failure initiation switch 52 is preferably a push button type switch that requires constant pressure to maintain an electrical connection, known to those skilled in the art as a normally open push button switch. The electrical connection is broken when the pressure is released. Although a push button type switch is preferred for the reasons described below, it is well within the scope of the present invention to use any other electrical switch capable of selectively supplying the current from the power source 50 to the failed system selector switch 58, and on to a valve as discussed below.

The failure initiation switch 52 is preferably designed to be held in the hand of the vehicle operator while the operator is driving the vehicle 10. Alternatively, the switch 52 can be located anywhere in the operator's compartment 22 where the operator would have easy and quick access to the switch 52.

The failed system selector switch 58 is preferably electrically connected to the failure initiation switch 52. The failed system 58 selector switch has a plurality of settings. In the preferred embodiment described herein and depicted in FIG. 3, the switch 58 has a primary brake system setting 60, an off setting 62, and a secondary brake system setting 64. The primary brake system setting 60 electrically connects the failure initiation switch 52 with a primary valve 66. The secondary brake system setting 64 electrically connects the failure initiation switch 52 with a secondary valve 68. The off setting 62 electrically separates the failure initiation switch 52 from the primary valve 66 and the secondary valve 68.

Preferably, the failed system selector switch 58 is located in the operator's compartment 22 of the vehicle 10 for easy and quick access to the switch 58. The switch 58 may be selectively mounted to the dash of the vehicle 10 with any mechanical fastener, hook and loop fasteners, and/or adhesives, or any other means known to those skilled in the art. Alternatively, the switch 58 may be located on the floor of the vehicle 10, preferably in a secured position, or it may be positioned adjacent the operator on the seat of the vehicle 10.

In a preferred embodiment, the primary valve 66 is a solenoid valve, hereinafter called a primary solenoid valve (same reference number will be used). The primary solenoid valve 66 is connected to the primary treadle valve 24 and to one or more primary brake system relay valves 70, known to those skilled in the art, of the primary brake system 16. The secondary valve 68 is also a solenoid valve, hereinafter called a secondary solenoid valve (same reference number will be used). The secondary solenoid valve 68 is connected to the secondary treadle valve 40 and to one or more secondary brake system relay valves 72, known to those skilled in the art, of the secondary brake system 18.

A method of using the apparatus described above comprises locating the vehicle 10 equipped with the above-described apparatus at a test track or test facility. A brake warm-up procedure, as known to those skilled in the art, may or may not be conducted. It can be appreciated that the process of locating the vehicle 10 at the test track, or test facility, and/or the brake warm-up procedure is best conducted with the failed system selector switch 58 in the off position setting 62.

The failed system selector switch 58 is located at the brake system which is desired to be selectively failed. For example, if the primary brake system 16 is the desired system to be selectively failed, the failed system selector switch 58 is positioned at the primary brake system setting 60, as shown in FIG. 3. Preferably, this selection is made manually by the vehicle operator while within the operator's compartment 22.

The vehicle operator accelerates the vehicle 10 to a predetermined speed and then engages the failure initiation switch 52. At the point when the vehicle 10 is in position to make the stop, the operator then depresses the brake pedal 20. The failure initiation switch 52 completes the electrical circuit between the battery power source 50, the failed system selector switch 58 and the primary solenoid valve 66. The primary solenoid valve 66 is energized and instantaneously interrupts a first braking signal from the primary treadle valve 24 to the primary brake system relay valve 70. The primary brake set 44, without air pressure, does not engage its associated wheels.

Depressing the brake pedal 20 engages the secondary treadle valve 40 which provides a second braking signal to the secondary brake system relay valve 72 to engage the secondary brake set 34. The secondary brake set 34 is used to slow and stop the vehicle 10 to determine the effectiveness of the secondary brake system 18.

At any time during the above-described test, the operator can release the failure initiation switch to 52 de-energize the primary solenoid valve 66. De-engerization of the valve 66 instantaneously provides air pressure to the primary brake system 16 to make the primary brake system 16 available for braking. It can be appreciated that the push button type switch is preferred since it can be released very quickly in emergency situations. The primary brake system 16 can then be used, in addition to the secondary brake system 18, to slow and stop the vehicle 10.

The effectiveness of the primary brake system 16 can also be tested by manually setting the failed system selector switch 58 to the secondary brake system setting 64. The vehicle operator accelerates the vehicle 10 to the predetermined speed and engages the failure initiation switch 52. At the point when the vehicle 10 is in position to make the stop, the operator depresses the brake pedal 20. The failure initiation switch 52 electrically connects the power source 50 with the secondary solenoid valve 68. The secondary solenoid valve 68 is energized and instantaneously interrupts the second braking signal from the secondary treadle valve 40 to the secondary brake relay valve 72. The secondary brake set 34, now without air pressure, does not engage its associated wheels.

The brake pedal 20 displacement engages the primary treadle valve 66 which provides the first braking signal to the primary brake system relay valve 70 to engage the first brake set 44. The first brake set 44 is used to slow and stop the vehicle 10 and the effectiveness of the primary brake system 16 can be determined.

It can be appreciated that the vehicle operator can release the failure initiation switch 52 at any point during testing to energize the second brake system 18 so the second brake system 18 and the brake system 16 can be used to slow and stop the vehicle 10.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. An air brake testing system, comprising:
    a failure initiation switch for selectively initiating a failure of a primary brake system or a secondary brake system of a moving vehicle;
    a failed system selector switch electrically connected to said failure initiation switch for selecting between said primary braking system and said secondary braking system; and
    a first valve selectively connected to said failure initiation switch through said failed system selector switch and a second valve selectively connected to said failure initiation switch through said failed system selector switch, said first valve in communication with a primary brake set and said second valve in communication with a secondary brake set.

2. The system of claim 1, wherein said failure initiation switch is connected to a 12-volt power source.

3. The system of claim 1, wherein said failure initiation switch is located in an operator's compartment of a vehicle.

4. The system of claim 3, wherein said failed system selector switch has at least a primary brake setting, an off setting, and a secondary brake setting.

5. The system of claim 3, wherein said failed system selector switch is located in said operator's compartment of said vehicle.

6. The system of claim 1, wherein said first valve is a first electrically operated solenoid valve and said second valve is a second electrically operated solenoid valve.

7. The system of claim 6, wherein said first solenoid valve is connected to a primary treadle and a primary brake relay control port.

8. The system of claim 6, wherein said second solenoid valve is connected to a secondary treadle and a secondary brake relay control port.

9. A method of using an air brake testing system, comprising:
    providing a first brake system and a second brake system of a vehicle;
    positioning a failed system selector switch at a first brake system setting or a second brake system setting;
    selectively activating a failure initiation switch electrically connected to said failed system selector switch; and
    selectively failing one of said brake systems and engaging said other brake system while said vehicle is moving.

10. The method of claim 9, wherein said failed system selector switch is manually positioned to one of said settings in an operator's compartment of a vehicle.

11. The method of claim 10, wherein said failure initiation switch is manually activated in said operator's compartment of said vehicle.

12. The method of claim 9, wherein said first brake system has a first solenoid valve connected to said failed system selector switch and said second brake system has a second solenoid valve connected to said failed system selector switch.

13. The method of claim 12, wherein activation of said failure initiation switch when said failed system selector switch is set to said first brake system setting closes said first solenoid valve to interrupt a first braking signal to said first brake system and said second solenoid valve allows a second braking signal to said second brake system.

14. The method of claim 13, wherein deactivation of said failure initiation switch when said failed system selector switch is set to said first brake system setting opens said first solenoid valve to allow said first braking signal to said first brake system.

15. The method of claim 13, wherein activation of said failure initiation switch when said failed system selector switch is set to said second brake system setting closes said second solenoid valve to interrupt said second braking signal to said second brake system.

16. The method of claim 15, wherein deactivation of said failure initiation switch when said failed system selector switch is set to said second brake system setting opens said second solenoid valve to allow said second braking signal to said second brake system.

17. A method of testing a vehicle air brake system, comprising:
    providing a first brake system and a second brake system of a vehicle;
    initiating a simulated failure of either said first brake system or said second brake system by selectively engaging a failure initiation switch while said vehicle is moving to brake said vehicle with either said first brake system or said second brake system; and
    aborting said simulated failure of either said first brake system or said second brake system by disengaging said failure initiation switch and providing one or more braking signals to brake said vehicle with both said first brake system and said second brake system.

18. The method of claim 17, wherein said failure initiation switch causes a braking signal to either said first brake system or said second brake system to be selectively interrupted.

19. The method of claim 17, wherein said failure initiation switch is electrically connected to a failed system selector switch for selectively testing either said first brake system or said second brake system.

20. The method of claim 19, wherein said failure initiation switch and said failed system selector switch are manually engaged within an operator's compartment of said vehicle.

* * * * *